(12) United States Patent
Kodama

(10) Patent No.: US 8,635,280 B2
(45) Date of Patent: Jan. 21, 2014

(54) METHOD FOR UTILIZING HETEROGENEOUS STORAGE SYSTEMS BY COOPERATING WITH SERVER SIDE STORAGE SOFTWARE

(75) Inventor: Shoji Kodama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 581 days.

(21) Appl. No.: 12/939,602

(22) Filed: Nov. 4, 2010

(65) Prior Publication Data

US 2012/0117154 A1    May 10, 2012

(51) Int. Cl.
*G06F 15/16* (2006.01)
(52) U.S. Cl.
USPC .......................... 709/205; 709/227; 707/821
(58) Field of Classification Search
None
See application file for complete search history.

(56) References Cited

U.S. PATENT DOCUMENTS

2007/0156842 A1* 7/2007 Vermeulen et al. ........... 709/217
2011/0072206 A1* 3/2011 Ross et al. .................... 711/108

* cited by examiner

*Primary Examiner* — Ario Etienne
*Assistant Examiner* — Clayton R Williams
(74) *Attorney, Agent, or Firm* — Brundidge & Stanger, P.C.

(57) ABSTRACT

In a service system having plural servers and storage systems connected via a network, a storage library is installed on all servers on which applications are running. All applications can use the storage library to create new data, read data, and update data in different types of backend storage systems. In one embodiment, the storage library holds a list of all storage systems which can be used for storing data, and manages capabilities of the storage systems, such as data replication and data integrity checking. The storage library is arranged to create a write profile for each created data in order to indicate how the data is being managed. A storage system and the storage library are thus able to avoid performing unnecessary data management (for example, redundant replication) by checking whether such data management is or has been performed by the storage library or by the storage system by referring to the write profile.

14 Claims, 13 Drawing Sheets

Storage Type Table

| Storage Type | Interface | RAID | Replication | # of Replicas | Replication Type | CRC Check |
|---|---|---|---|---|---|---|
| PC_Server_A | HTTP | NO | NO | 0 | NO | NO |
| PC_Server_B | HTTP | NO | YES | 2 | ASYNC | NO |
| RAID_Storage_C | NFS | YES | NO | 0 | NO | YES |
| ⋮ | | | | | | |
| RAID_Storage_D | OSD | YES | YES | 1 | SYNC | YES |

Storage List

| IP Address | Storage Type | Managed Hash Space | Initial Replication | Next Storage |
|---|---|---|---|---|
| 192.168.1.10 | PC_Server_A | [0000, 2000) | N/A | N/A |
| 192.168.1.20 | PC_Server_B | [2000, 4000) | DONE | NEXT_HASH |
| 192.168.1.30 | RAID_Storage_C | [4000, 6000) | N/A | N/A |
| 192.168.1.40 | RAID_Storage_D | [8000, A000) | ON_GOING | 192.168.1.60 |
| 192.168.1.50 | PC_Server_B | [A000, B000) | DONE | NEXT_HASH |
| 192.168.1.60 | RAID_Storage_D | [B000, C000) | ON_GOING | 192.168.1.40 |
| 192.168.1.70 | PC_Server_B | [C000, D000) | DONE | NEXT_HASH |
| 192.168.1.80 | RAID_Storage_C | [D000, FFFF) | N/A | N/A |

0401
Write Request

| 0402 | Object Name | picture01.jpg |
| 0403 | # of Replicas | 3 |
| 0404 | Replication Type | SYNC |
| 0405 | CRC Check | YES |

FIG. 4

0501
Read Request

| 0502 | Object Name | picture01.jpg |
| 0503 | Load Balancing | YES |
| 0504 | # of Replicas | 3 |

FIG. 5

Write Profile

| | | |
|---|---|---|
| 0601 | Object Name | picture01.jpg |
| 0602 | Date | 2010/3/31 11:28:00 |
| 0603 | Server MAC | 11:22:33:44:55:66:77:88 |
| 0604 | Primary | 192.168.1.30 |
| 0605 | Secondary | 192.168.1.80, 192.168.1.40, 192.168.1.50 |
| 0606 | Self Replication | YES |
| 0607 | Replication Type | SYNC |
| 0608 | # of Replicas | 3 |
| 0609 | Self CRC Check | NO |
| 0610 | CRC | N/A |

FIG. 6

METHOD FOR UTILIZING HETEROGENEOUS STORAGE SYSTEMS BY COOPERATING WITH SERVER SIDE STORAGE SOFTWARE

BACKGROUND OF THE INVENTION

Current system architecture of typical web service systems is optimized vertically from the web browser to the Internet, web servers and storage servers so as to be scalable and highly available at lower less cost. Major web service providers develop their own storage software to manage data generated and used for their services in a homogeneous environment, but because of this, existing independent storage products cannot be used in or co-exist with their web service systems.

For example, in some web service systems, web servers create replicas of data by themselves. When new data is created by a user, a web server stores the data to one location and a replica of the data to another location. Because they typically use general-purpose PC servers for storing data and such PC servers do not have the capability to replicate data to other PC servers, web servers are required to create and manage replicas of data among multiple PC servers. Further, although dedicated storage system products are known that have data replication functions, they are much more costly to purchase and use in comparison to PC servers.

Further, vertical optimization or vertical integration carries the risk that, if new storage technologies become available that provide greater benefits when incorporated into a web service system, the system architecture must be changed to accommodate the new technologies as the web service system was not designed for using the new technologies. This change requires a lot of software development and which has a big impact on the cost.

In the above example, data is replicated by the web servers. If a new storage system becomes available that costs less than the current PC server used for storing data, web service providers may consider adopting the new storage system. Such a new storage system, for example, may be capable of replicating data among other storage systems, but because the web servers are replicating data by themselves, incorporating the data replication features in the storage system is redundant if not useless, unless the data replication program can be turned off or disabled in order to use this feature of the new storage system and remove unnecessary redundant data replication. Such changes may require additional developments and cost and so the web service providers may hesitate to adopt such new storage technologies for their vertically optimized systems.

The conventional web service system architecture would thus benefit from increased flexibility of utilizing new and different storage technologies in a heterogeneous environment.

SUMMARY OF THE INVENTION

Data lifecycle management provides users the capability of managing data locations among different types of storage systems while the users are able to continue to access the data without knowing where the data is stored. Such data lifecycle management can be done at a server layer on which storage library software is installed. The storage library decides and moves the location of data according to the value of the data.

Current data lifecycle management schemes do not consider data management capabilities at the server layer working with similar capabilities available at the storage layer. Methods for cooperation between server side storage capabilities and storage side storage capabilities would therefore be a useful enhancement to the conventional service system architecture.

To this end, new storage library software may be installed on all servers on which applications are running. All applications can use the storage library to create new data, read the data, and update the data in different types of backend storage systems, for example.

In this configuration, the storage library holds a list of all storage systems which can be used for storing data, and manages capabilities of the storage systems. It is assumed that the capabilities of the storage systems may be different.

Like the storage systems, the storage library also has capabilities of data management, such as data replication and data integrity checking, but in one embodiment uses such capabilities only when requested by an application and when a storage system does not itself have such capabilities.

The storage library is arranged to create a write profile for each created data in order to indicate how the data is being managed. A storage system and the storage library are thus able to avoid performing unnecessary data management (for example, redundant replication) by checking whether such data management is or has been performed by the storage library or by the storage system by referring to the write profile.

Because storage systems fail, the data replication relationship among storage systems is changed from time to time. The write profile is used by the storage library to keep the locations of replicas before the data is replicated.

BRIEF DESCRIPTION OF THE DRAWINGS

FIG. 2 shows an example of a storage type table;

FIG. 3 shows an example of a storage list;

FIG. 4 shows an example of a write request created and issued by an application to a storage library;

FIG. 5 shows an example of a read request created and issued by an application to a storage library;

FIG. 6 shows an example of a write profile;

DETAILED DESCRIPTION

Figure 1:
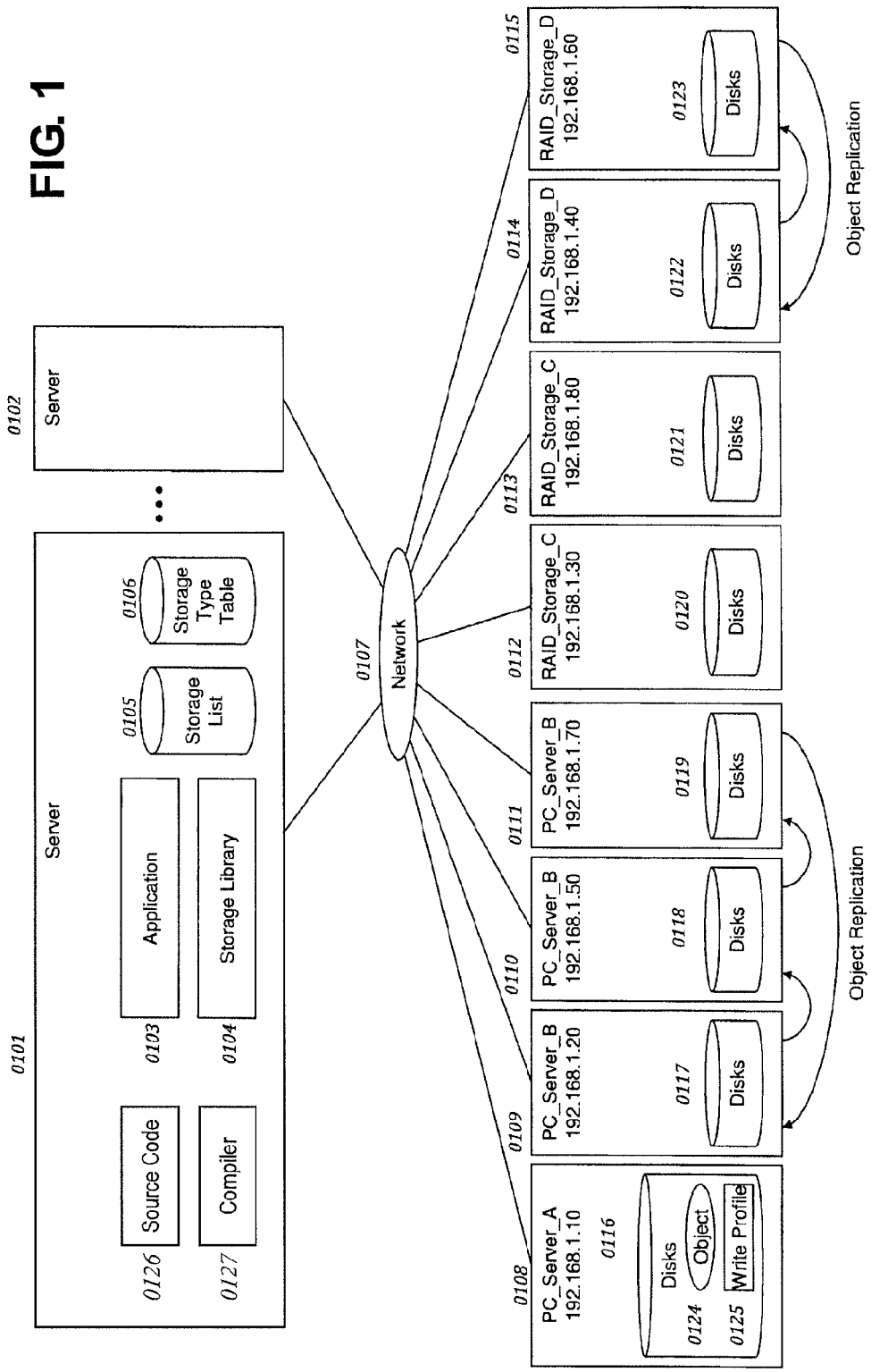
FIG. 1 shows an example of an overall system diagram consisting of multiple servers, different types of storage nodes, and a network.

FIG. 1 shows an overall service system diagram of an embodiment constructed according to the teachings of this invention. In the context of this disclosure, the person of ordinary skill in the art will understand the nature of the disclosed embodiments in the context of web service or cloud computing systems, for example, but the disclosed embodiments and the appended claims are not limited to the specific examples shown.

Turning to FIG. 1, the illustrated service system includes multiple servers 0101, 0102, a plurality of different types of storage nodes 0108-0115, and a network 0107. The service system may have as many servers, networks and/or subnetworks, and storage systems/storage nodes as desired, of which the illustrated components are considered exemplary. Thus, in many instances, only one component of a kind may be discussed in detail, but it should be understood that more than one, or all, like components may be constructed and function in a manner similar to that of the component that is described with particularity.

On a server, an application or applications 0103 are running and a storage library 0104 is installed. Source code 0126 is a program which includes a request for data. A compiler 0127 compiles the program of Source code 0126 into an executable format. Then, an application or applications 0103 send the request for data and transfer the request for data as a parameter to a storage library 0104, and the request for data is executed appropriately by the storage library 0104.

Each server has a storage list 0105 and a storage type table 0106. Each storage node has one or more disks 0116-0123 to store data, and in particular objects 0124 and a write profile 0125 for each object. The network connects servers and storage nodes so they are able to communicate with each other.

In general, an application creates new data, reads data and updates data. Data is stored to a storage node and a replica or replicas of the data may be created in one or more other storage nodes, but it is not necessary for the application making the request for access to the storage to specify in which storage node new data is created or from which storage node data is read. An application specifies an object name of data when it creates or reads the data and a storage library decides to/from which storage node the data is being created and read. In this disclosure, "object" will sometimes be used to represent "data", as understood from the context in which each is used.

The storage nodes have different object management capabilities such as object replication and object integrity checking. Further, the storage nodes may be of different types: one storage node may be a PC server which has no object management capability, another storage node may perform object replication but not object integrity checking, and yet another may be a RAID storage system that is dedicated to store and manage objects and that has many object management capabilities.

A storage library decides whether the storage library is to perform object management by itself, according to the object management capabilities of a storage system to which an object is created. A storage type table is used to know which object management capabilities a storage system has and if such capabilities meet a request from an application. If a storage library decides not to take advantage of a storage system's capabilities, it performs such object management by itself.

A storage library creates a write profile 0124 for each newly created object. A write profile holds information indicating the manner in which an object is managed by the system. In particular, this information indicates how and where data is replicated and its integrity is checked.

FIG. 2 shows an example of a storage type table 0106. For each different type of storage node, there is one entry for storage type and object management capabilities which the storage node has. The illustrated table shows columns for Storage Type 0201, Interface 0202, RAID 0203, Replication 0204, # of Replicas 0205, Replication Type 0206, and CRC Check 0207.

"Storage Type" identifies each different storage type. "Interface" tells a protocol to be used for storing to and reading objects from a storage node (for example, NFS (Network File System) and HTTP (Hyper Text Transfer Protocol)). "RAID" (Redundant Array of Independent Disks) tells whether data is protected by a storage system by providing redundancy of data in a RAID system. "Replication" tells whether a storage node is capable of replicating new or updated object to another storage node. "# of Replicas" tells how many replicas of an object are created by a storage node. "Replication Type" tells whether an object is replicated to another storage node synchronously with object creation or modification. A storage node responds to a request from a server after all data replications are completed. "CRC Check" tells whether a storage node holds a check code of an object's data, and checks whether the data is corrupted by checking the check code before sending the requested data to a requesting server.

When a new type of a storage system is added to the system, an administrator updates a storage type table being managed by all storage libraries in the system. Such an update can be done efficiently by distributing a new storage type table to all of the storage libraries via a network.

FIG. 3 shows an example of a storage list 0105. Each entry is created for each storage system in the system. This list has columns for IP Address 0301, Storage Type 0302, Managed Hash Space 0303, Initial Replication 0304, and Next Storage 0305. "IP Address" is an IP address of a storage node.

"Storage Type" is a storage type of a storage system. "Managed Hash Space" is a part of a hash space which a storage system has a responsibility. A hash space starts from 0 to a maximum hash value such as FFFF in this example. An object has its own hash value calculated from its object name, and the object is stored in a storage node which manages the hash space in which the hash value of the object is included. For example, consider an object with the name "abc.txt" and the hash value "2525". The storage node identified by 192.168.1.20 manages a hash space starting from 2000 and ending by 4000, and its managed hash space thus includes the hash value (2525) of the object. Therefore, the object is stored in this storage node. A managed hash space is decided for each storage node by calculating a hash value from an IP address of the storage node. For example, if a hash value of an IP address 192.168.1.40 is "8000", the managed hash space of this storage node starts from 8000. The end of the hash space is determined by the hash value of another storage node which hash value is larger than the hash value of 192.168.1.40, but no other storage node has a hash value which is smaller than the hash value of another storage node and larger than the hash value of the storage node itself. In the example of FIG. 3, the hash value of IP address 192.168.1.50 is "A000", which meets the condition such that the end of the managed hash space of IP address 192.168.1.40 is A000.

"Initial Replication" tells whether initial data replication has been completed when a storage node is newly added to the system and the storage node has a data replication capability.

"Next Storage" tells how to decide to which storage node data is replicated. For example, if two RAID storage systems (192.168.1.40 and 192.168.1.60) are configured as a pair and replicate data to each other, the next storage node for 192.168.1.40 is 192.168.1.60 because data in 192.168.1.40 is replicated to 192.168.1.60 by the storage system, and vice versa. It is possible for data to be replicated to multiple storage nodes. For such a case, NEXT_HASH is used to indicate how to determine all storage nodes to which data has been replicated. In the present embodiment, it is assumed that a server and a storage node use the same hashing calculation. In such a case, the next storage node of a storage node is decided from the managed hash space. For example, PC server 192.168.1.20 has its managed hash space [2000, 4000). From the storage list, the next managed hash space ("NEXT_HASH") of a storage node which storage type is the same as that of PC server 192.168.1.20 is PC server 192.168.1.50, and so the next storage node of 192.168.1.20 is 192.168.1.50. The next storage node of 192.168.1.50 is 192.168.1.70, which is determined in the same way. From the example of FIG. 2, an object is replicated to two different PC servers; in other words, PC server 192.168.1.20 replicates data to 192.168.1.50 and then 192.168.1.50 replicates the same data to 192.168.1.70 to complete the replication. In the same way, the next storage node to 192.168.1.70 is 192.168.1.20 because they is no further node to 192.168.1.70 in the hash space. However, when more storage nodes are added, the hash space and NEXT_HASH may be adjusted accordingly. A storage library is able to determine this replication relationship from the storage list and a rule of deciding the next storage node without asking to any storage node.

FIG. 4 shows an example of a write request 0401 created and issued by an application to a storage library. A write request specifies an object to be written and an application's request for how the object is to be managed. A write request has rows for Object Name 0402, # of Replicas 0403, Replication Type 0404, and CRC Check 0405. "Object Name" identifies an object name of an object to be written. An object name is decided by an application which ensures that the object name is unique in the system. "# of Replicas" indicates how many replications of data are necessary for an application. In general, this number is based on the need for high availability and throughput. "Replication Type" indicates the timing in which a replication must be created. In the case of SYNC, replications are completed before an application gets a response from a storage library. This provides secure object replication without data loss but involves a larger response time. In the case of ASYNC, replications are performed after the storage library responds to the requesting application. "CRC Check" tells whether a CRC check is required. A CRC check is a check to determine whether an object's data has changed while being stored in a storage library.

In general, an application is a program compiled from source code. How data is managed by a storage node can be written in the source code as follows.

In this example, requirements for data management are specified by tags such as <HighAvailability>, <HighThroughput>, <AsyncReplication> and <DataIntegrityCheck>. If <HighAvailability> or <HighThroughput> is set, multiple replications of data are requested in a write request. If <HighThroughput> is set, load balancing is requested in a read request. If <AsyncReplication> is set, Asynchronous replication is requested in a write request. If <DataIntegrityCheck> is specified, CRC check is requested in a write request. As above, a programmer is able to write a request for data management in a code and such requests are translated to write requests and read requests to a storage library 0126 by a compiler 0127.

```
Class ABC {
    // Requirement for Data Management
    <HighAvailability>
    <HighThroughput>
    <AsyncReplication>
    <DataIntegrityCheck>
    // Data
    String abc;
    Int def;
    Date ghi;
    // Codes
    void main ( ) {
        printf ("Hello World!");
    }
}
```

FIG. 5 shows an example of a read request 0501 created and issued by an application to a storage library. A read request specifies an object to be read and whether load balancing is necessary for reading data among the storage nodes which have replicas of the object. "Object Name" 0502 is an object name of an object. "Load Balancing" 0503 indicates if a load balancing is required. "# of Replicas" 0504 indicates how many replicas are created.

FIG. 6 shows an example of a write profile 0125. A write profile is created by a storage library when a new object is created. The illustrated write profile has rows for Object Name 0601, Date 0602, Server MAC 0603, Primary 0604, Secondary 0605, Self Replication 0606, Replication Type 0607, # of Replicas 0608, Self CRC Check 0609, and CRC 0610. "Object Name" is a name of an object. "Date" is a date and time at which an object is created or updated. "Server MAC" is a MAC address of a server which creates an object. "Primary" is a storage node which stores an original of an object. "Secondary" is a list of storage nodes which store replicas of an object. "Secondary" need not list all storage nodes which store replicas when a replication is achieved by a storage node itself. It should be noted that there are cases that some replications have been done by storage nodes while other replications have been done by a storage library when many replications are necessary. "Self Replication" indicates whether a storage library is required to create replicas. "Replication Type" indicates whether replication must be done in SYNC or ASYNC modes. "# of Replicas" is the number of replicas created by a storage library. It should be noted that this number does not increase the number of replicas created by a storage node. "Self CRC Check" indicates whether a CRC check is required by a storage library. The CRC is an actual value of CRC calculated from an object's data.

When an application creates an object, it creates a write request and sends the request to a storage library. Then, an Object Write procedure of the storage library is called.

Figure 7:
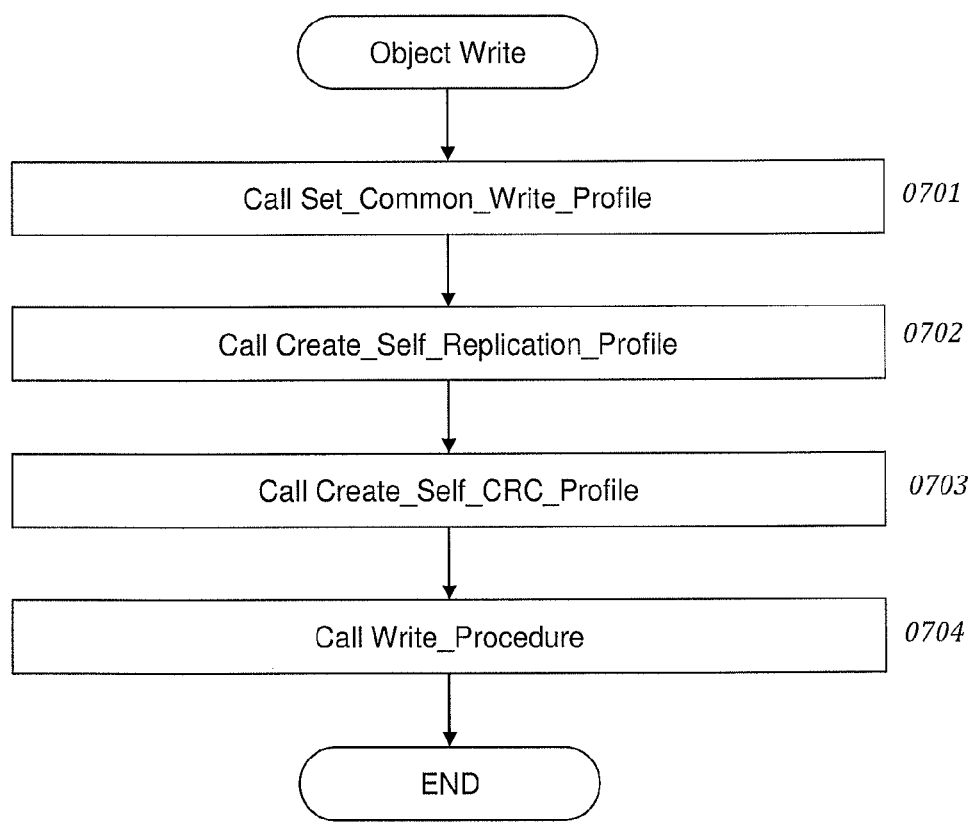
FIG. 7 shows an example of a flowchart of an Object Write procedure performed by the storage library.

FIG. 7 shows a flowchart of an exemplary Object Write procedure.

Step 0701: The storage library calls a Set_Common_Write_Profile procedure.

Step 0702: The storage library calls a Create_Self_Replication_Profile procedure.

Step 0703: The storage library calls a Create_Self_CRC_Check_Profile procedure.

Step 0704: The storage library calls a Write_Procedure.

Each of these procedures is explained as follows.

Figure 8:
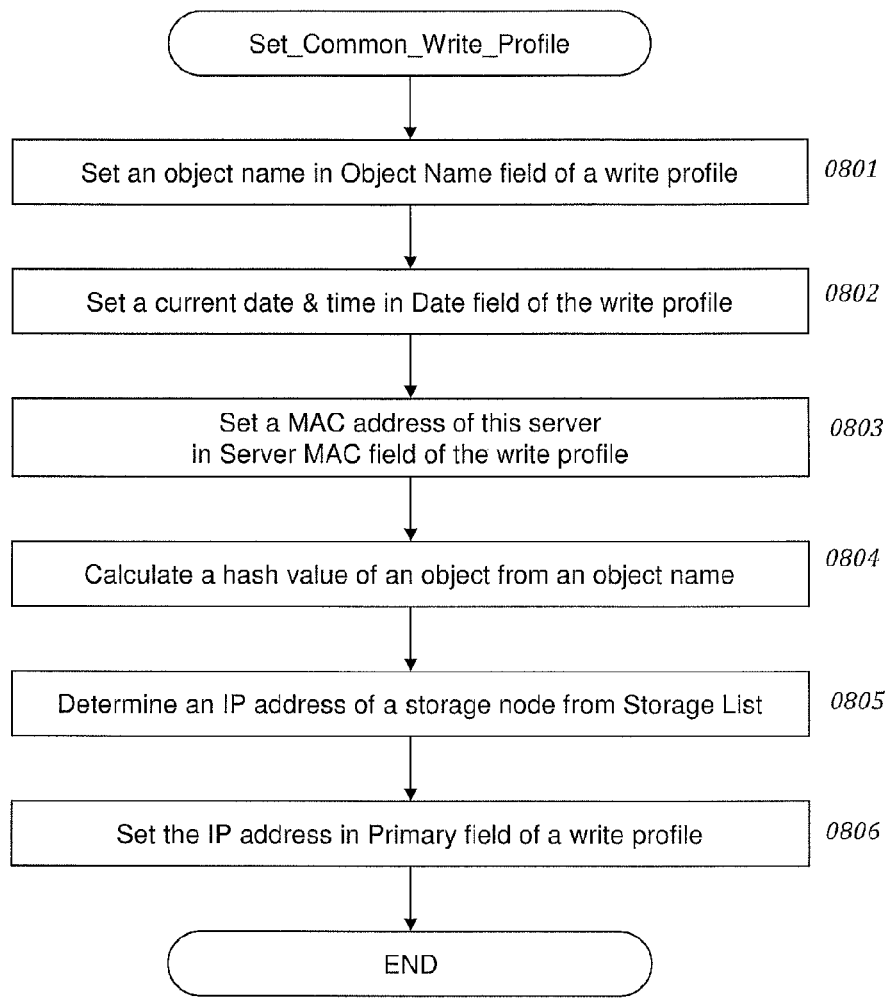
FIG. 8 shows an example of a Set_Common_Write_Profile procedure called by the storage library in the Object Write procedure of FIG. 7.

FIG. 8 shows an example of the Set_Common_Write_Profile procedure. This procedure creates a write profile and sets basic information common to all objects.

Step 0801: The storage library sets an object name in the Object Name field of the write profile.

Step 0802: The storage library sets a current date and time in the Date field of the write profile.

Step 0803: The storage library sets a MAC address of the server in the Server MAC field of the write profile.

Step 0804: The storage library calculates a hash value from an object name.

Step 0805: The storage library determines the storage node that manages the hash space that includes the hash value calculated in Step 0804.

Step 0806: The storage library sets an IP address of the storage node in the Primary field of the write profile.

Figure 9:
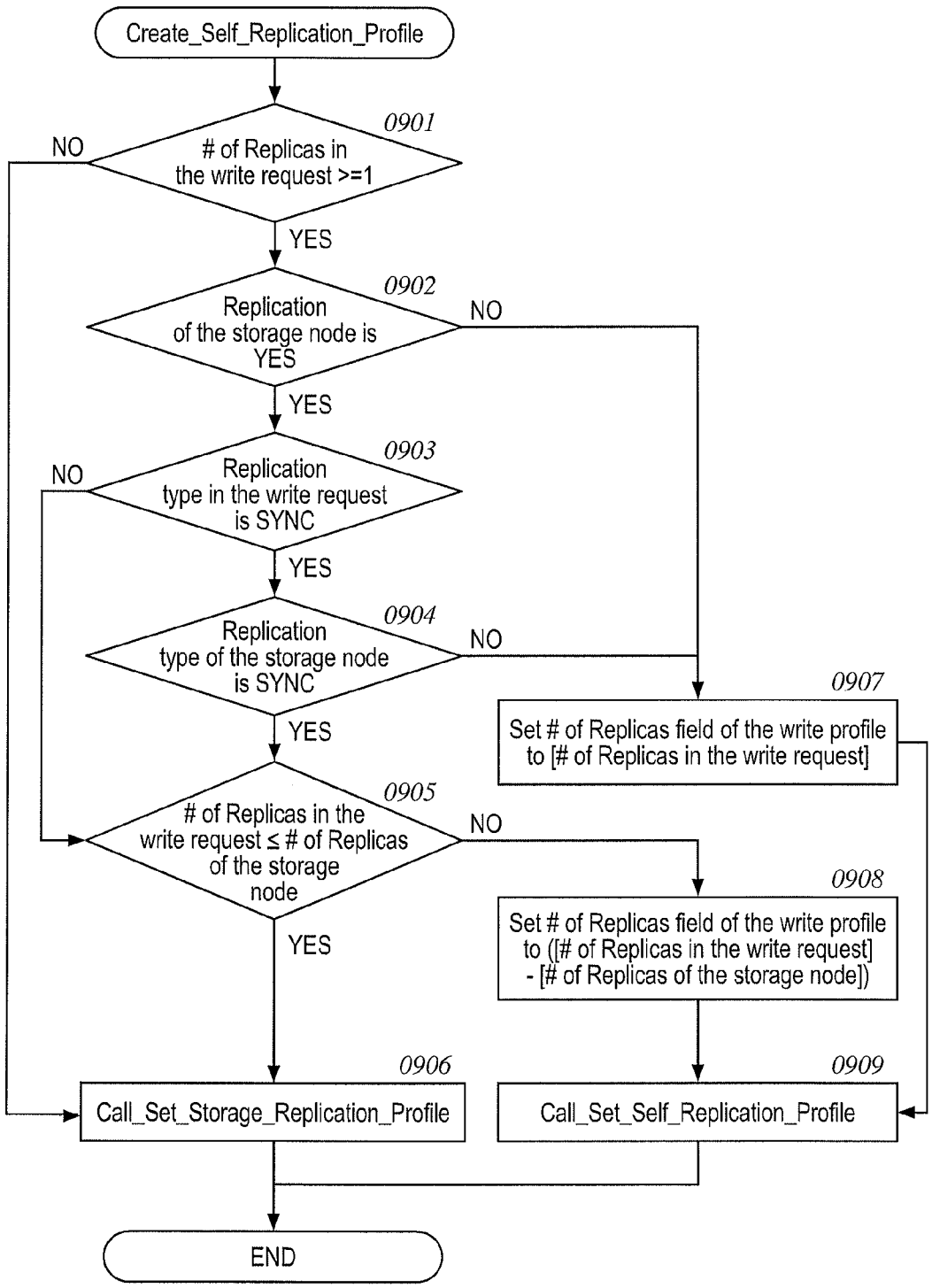
FIG. 9 shows an example of a Create_Self_Replication_Profile procedure called by the storage library in the Object Write procedure of FIG. 7.

FIG. 9 shows an example of the Create_Self_Replication_Profile procedure. This procedure is the main procedure which decides who creates replications of data.

Step 0901: The storage library checks whether the # of Replicas in a write request is not zero.

Step 0902: If the answer to Step 0901 is YES, the storage library checks whether the storage node determined in Step 0805 is able to replicate data by itself from the storage type table.

Step 0903: If the answer to Step 0902 is YES, the storage library checks whether a synchronous replication is required.

Step 0904: If the answer to Step 0903 is YES, the storage library checks whether the storage node has the replication type SYNC from the storage type table.

Step 0905: If the answer to Step 0904 is YES, the storage library checks whether replications by the storage node are requested by the application by judging whether the number of replicas in the write request are equal or fewer than the number of replicas of the storage node.

Step 0906: If the answer to Step 0905 is YES, the storage library calls the Set_Storage_Replication_Profile procedure and then ends.

Step 0907: If the answer to Step 0904 is NO, the storage library sets the number of replicas requested in the write request to the # of Replicas field of the write profile.

Step 0908: If the answer to Step 0905 is NO, the storage library sets the number of replicas requested in the write request minus the number of replicas performed by a storage node to the # of Replicas field of the write profile.

Step 0909: The storage library calls the Set_Self_Replication_Profile and ends.

Figure 10:
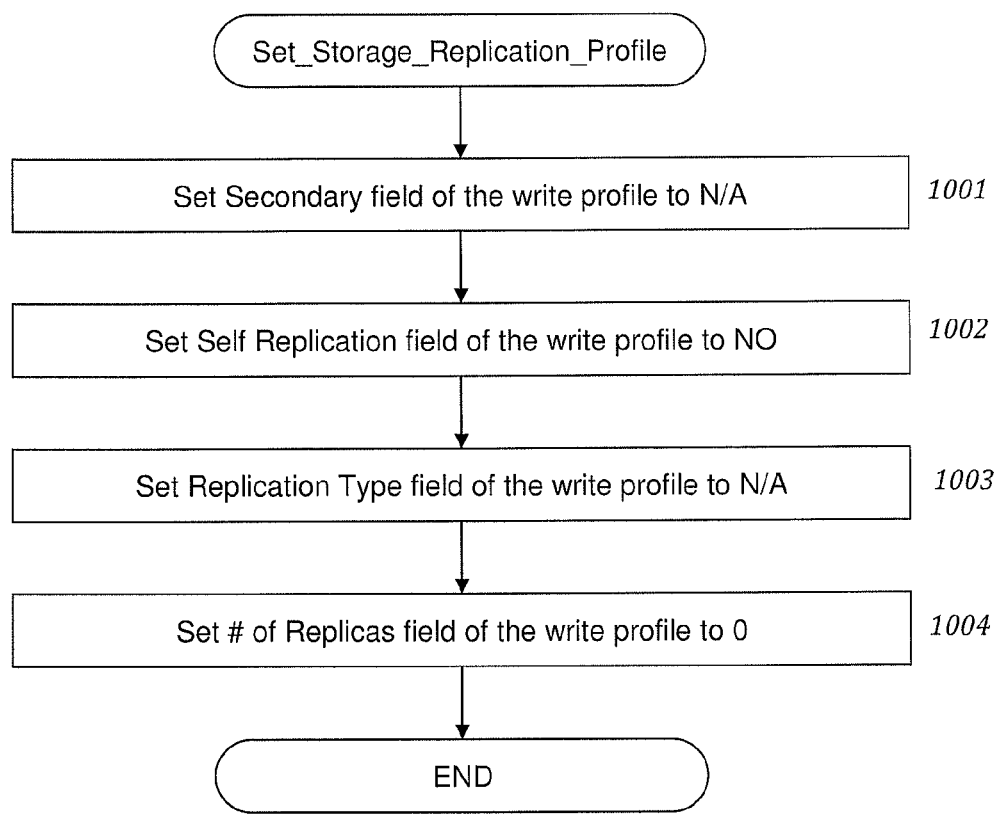
FIG. 10 shows an example of a Set_Storage_Replication_Profile procedure called by the storage library in the Create_Self_Replication_Profile procedure of FIG. 9.

FIG. 10 shows an example of the Set_Storage_Replication_Profile procedure. In this case, the server need not replicate the object, all replications having been done by the storage node.

Step 1001: The storage library sets the Secondary field of the write profile to N/A.

Step 1002: The storage library sets the Self Replication field of the write profile to NO. Step 1003: The storage library sets the Replication Type field of the write profile to N/A.

Step 1004: The storage library sets the # of Replicas field of the write profile to 0.

Figure 11:
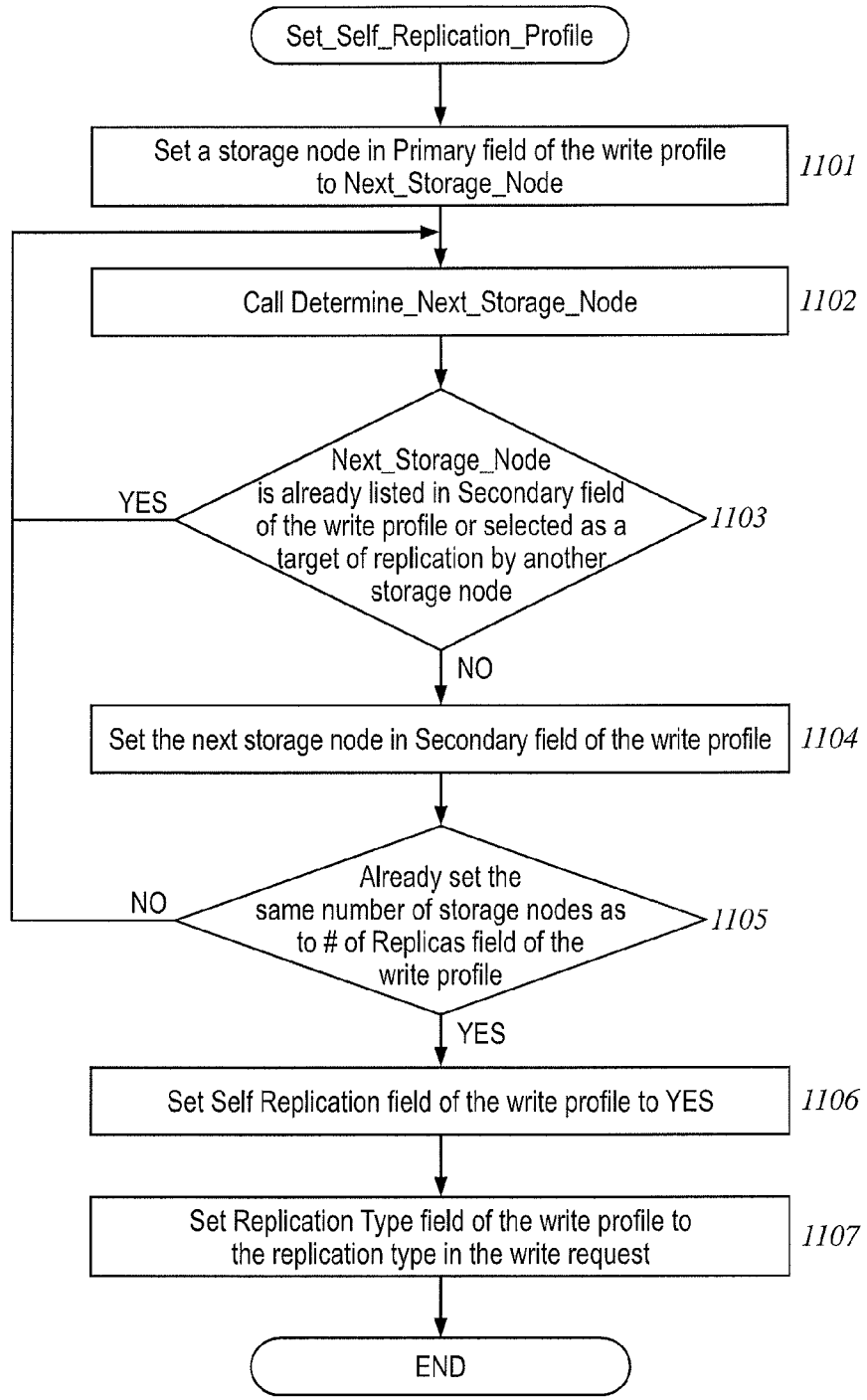
FIG. 11 shows an example of a Set_Self_Replication_Profile procedure called by the storage library in the Create_Self_Replication_Profile procedure of FIG. 9.

FIG. 11 shows an example of the Set_Self_Replication_Profile procedure. In this case, a server replicates objects to other storage nodes.

Step 1101: The storage library sets an IP address of a storage node in the Primary field of the write profile into the Next_Storage_Node variable.

Step 1102: The storage library calls the Determine_Next_Storage_Node procedure. After this procedure, the next storage node of the Primary storage node will be determined and stored in the Next_Storage_Node variable.

Step 1103: The storage library checks whether the next storage node is a storage node which is already listed in the Secondary field of the write profile or a storage node which is already selected as a target of replication by another storage node in the Set_Storage_Replication_Profile shown in FIG. 10. If so, it looks for another storage node as a next storage node because all replicas must be created to different storage nodes.

Step 1104: If not, the storage library sets the next storage node in the Secondary field of the write profile.

Step 1105: The storage library checks whether it has finished finding the same number of storage nodes as the # of Replicas in the write profile. If not, it looks for another storage node.

Step 1106: If so, the storage library sets the Self Replication field of the write profile to YES.

Step 1107: The storage library sets the Replication Type field of the write profile to the same value as the Replication Type field of the write request.

Figure 12:
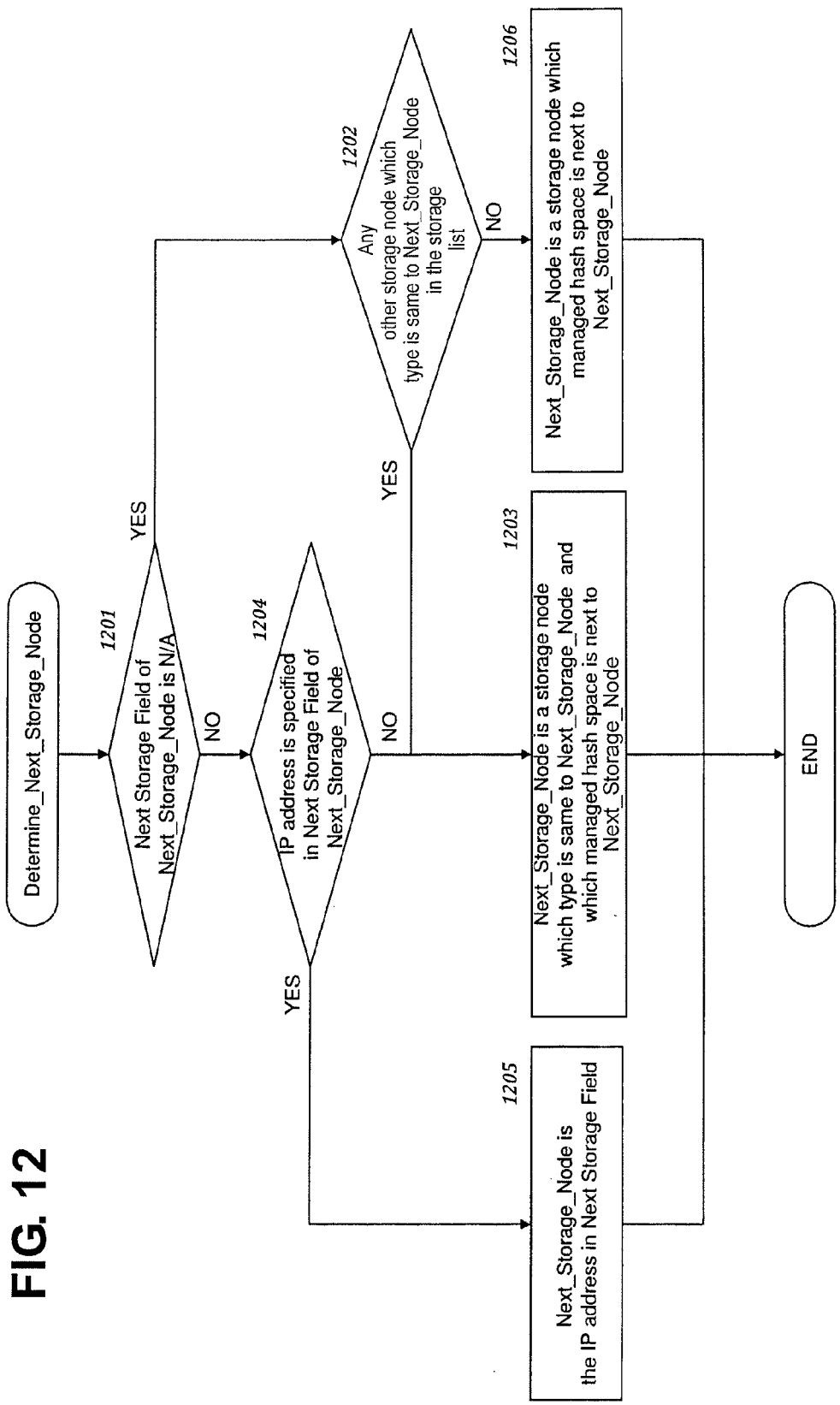
FIG. 12 shows an example of a Determine_Next_Storage_Node procedure called by the storage library in the Set_Self_Replication_Profile procedure of FIG. 11.

FIG. 12 shows an example of the Determine_Next_Storage_Node procedure. A Next_Storage_Node variable contains an IP address of a storage node, the next storage node of which will be found by this procedure, and an IP address of the found next storage node is contained in the Next_Storage_Node variable and returned to the caller of this procedure. The storage library tries to find a next storage node which has a replication relationship to a storage node specified by Next_Storage_Node. If such storage node cannot be found, the storage library returns a storage node which managed hash space is next to the storage node specified by Next_Storage_Node.

Step 1201: The storage library checks whether the Next Storage field of an entry in the storage list corresponding to a storage node specified by the Next_Storage_Node variable is "N/A".

Step 1202: If the answer to Step 1201 is YES, the storage library checks whether there are any other storage nodes, the storage type of which is the same as the storage node specified by Next_Storage_Node.

Step 1203: If the answer to Step 1202 is YES, the storage library sets a storage node having the same storage type as that of the storage node specified by Next_Storage_Node and whose managed hash space is next to the managed hash space of the storage node specified by Next_Storage_Node, to Next_Storage_Node, and the procedure ends.

Step 1204: If the answer to Step 1201 is NO, the storage library checks whether an IP address is specified in the Next Storage field corresponding to Next_Storage_Node in the storage list.

Step 1205: If the answer to Step 1204 is YES, the storage library sets an IP address in the Next Storage field of the storage list to the Next_Storage_Node and the procedure ends.

Step 1206: If the answer to Step 1202 is NO, the storage library sets the IP address of the storage node whose managed hash space is next to the managed hash space of the storage node specified by Next_Storage_Node to Next_Storage_Node, and the procedure ends.

Figure 13:
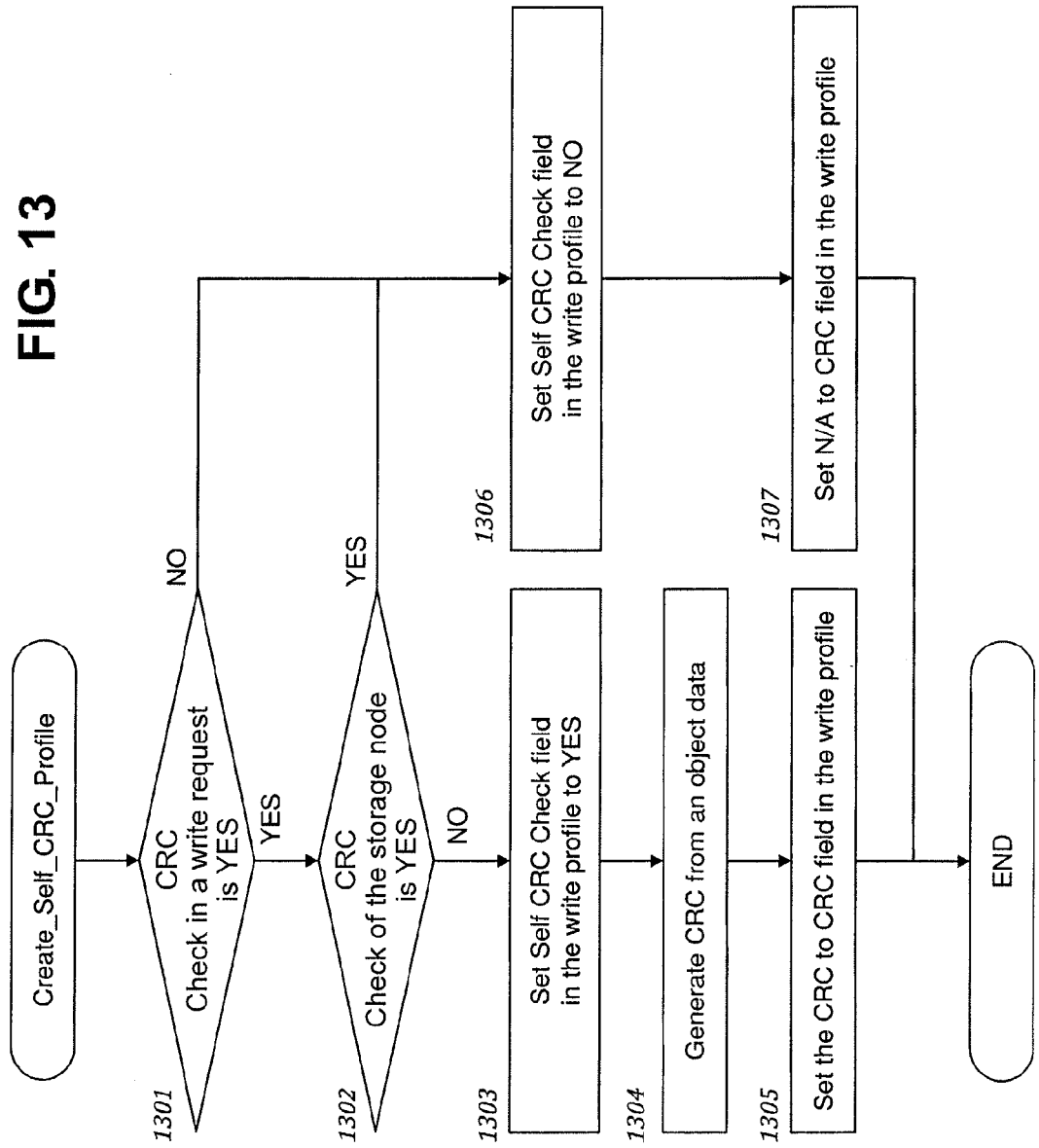
FIG. 13 shows an example of a Self_CRC_Profile procedure called by the storage library in the Object Write procedure of FIG. 7.

FIG. 13 shows an example of the Self_CRC_Profile procedure. This procedure determines whether a CRC check is required by the storage library.

Step 1301: The storage library checks whether the CRC Check field in a write request is YES.

Step 1302: If the answer to Step 1301 is YES, the storage library checks whether a storage node in the Primary field of the write profile has a CRC check capability.

Step 1303: If the answer to Step 1302 is NO, the storage library sets the Self CRC Check field in the write profile to YES.

Step 1304: The storage library generates a CRC value from an object's data.

Step 1305: The storage library sets the calculated CRC to the CRC field in the write profile and the procedure ends.

Step 1306: If the answer to Step 1301 is NO or the answer to Step 1302 is YES, the storage library sets the Self CRC Check field of the write profile to NO.

Step 1307: The storage library sets the CRC field of the write profile to N/A and the procedure ends.

Figure 14:
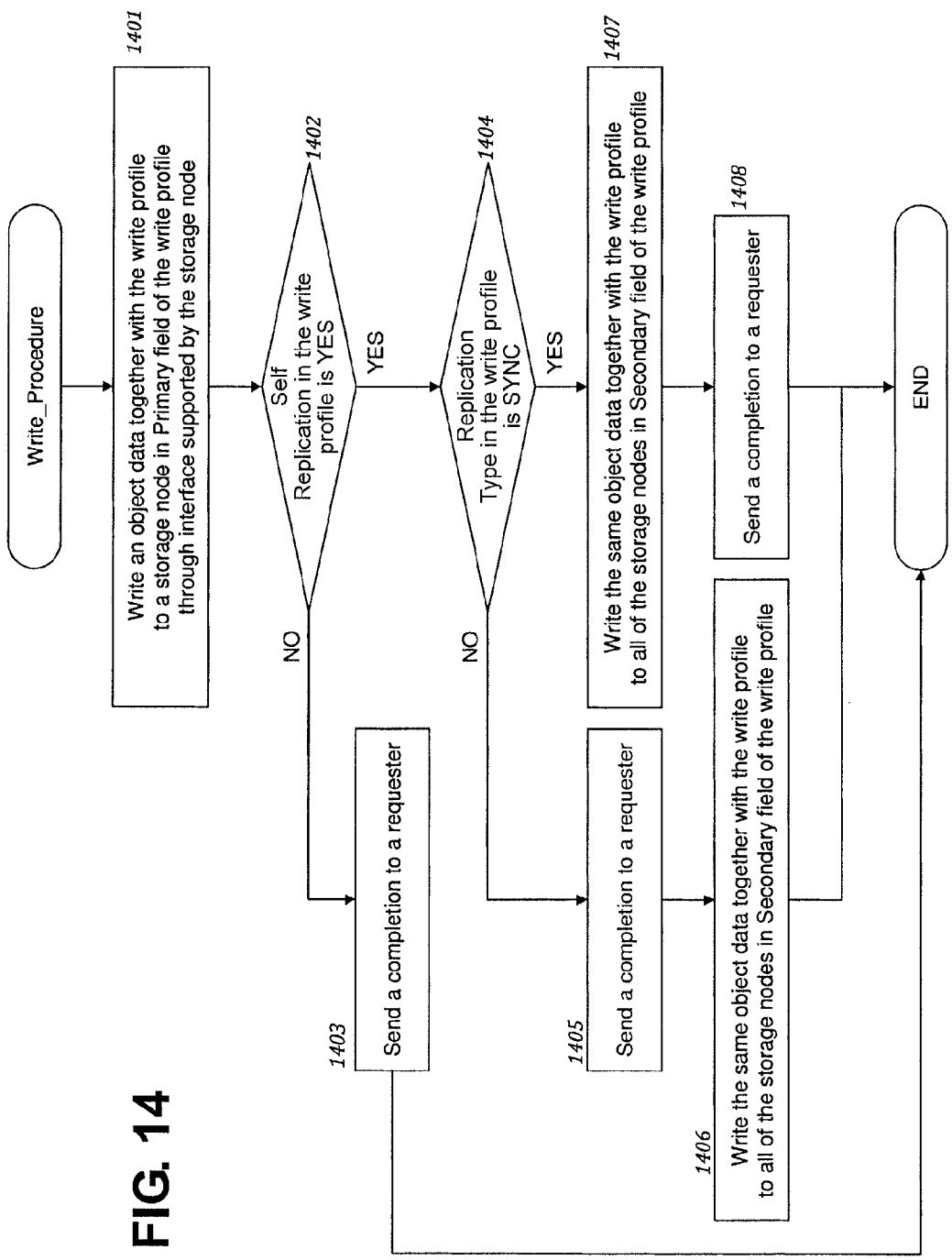
FIG. 14 shows an example of a Write_Procedure which is called by the storage library in the Object Write procedure of FIG. 7, when a write profile is created.

FIG. 14 shows an example of the Write_Procedure that is called when a write profile is created.

Step 1401: The storage library writes the object data to a storage node specified in the Primary field of the write profile by using an interface specified in the Interface field of the storage node in the storage type table.

Step 1402: The storage library checks whether Self Replication in the write profile is YES.

Step 1403: If the answer to Step 1402 is NO, the storage library sends a completion message to the requester because no replication is necessary by the storage library, and the procedure ends.

Step 1404: If the answer to Step 1402 is YES, the storage library checks whether the Replication Type field of the write profile is SYNC.

Step 1405: If the answer to Step 1404 is NO, the storage library sends a completion message to the requester because asynchronous replication is requested.

Step 1406: The storage library copies the object data to all of the storage nodes listed in the Secondary field of the write profile, and the procedure ends.

Step 1407: If the answer to Step 1404 is YES, the storage library copies the object data to all of the storage nodes listed in the Secondary field of the write profile.

Step 1408: The storage library sends a completion message to the requester when all object copies have been completed, and the procedure ends.

Figure 15:
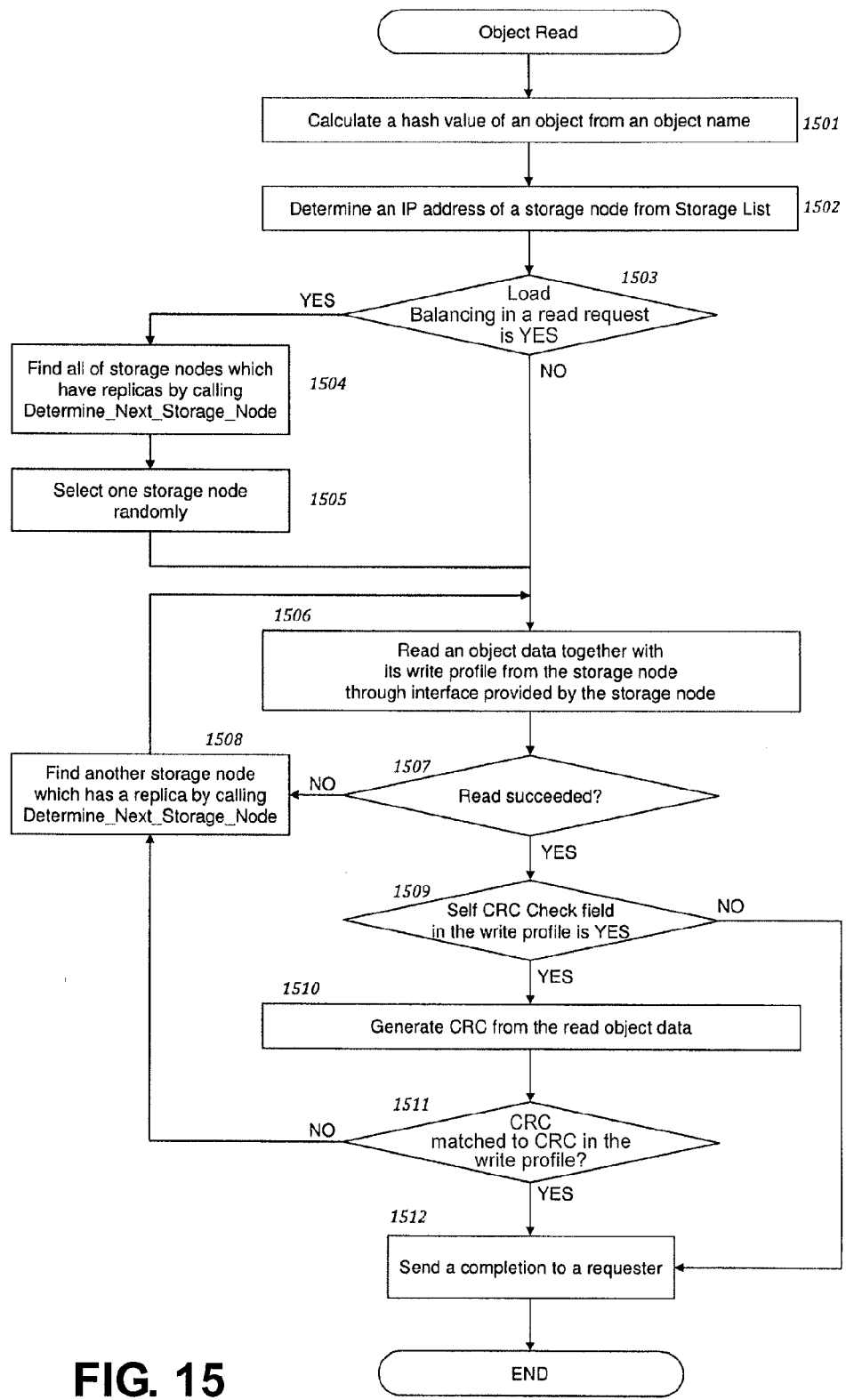
FIG. 15 shows an example of an Object Read procedure which is called by the storage library when an application issues a read request to the storage library.

FIG. 15 shows an example of the Object Read procedure which is called when an application issues a read request to the storage library. For reading an object, the procedure shown in FIG. 15 may be considered to make two determinations: whether load balancing is required, and whether CRC checking is required.

Step 1501: The storage library calculates a hash value of an object from an object name.

Step 1502: The storage library determines a storage node which has an original object from the storage list.

Step 1503: The storage library checks whether load balancing is requested in the read request.

Step 1504: If the answer to Step 1503 is YES, the storage library finds all storage nodes which have replicas by calling the Determine_Next_Storage_Node procedure (FIG. 12). The storage nodes are identified by the same method described in the Create_Self_Replication_Profile procedure (FIG. 9). This procedure requires the number of replicas. If the number of replicas was not provided from an application, the storage library reads the write profile from the storage node to determine how many objects are replicated. If the storage node fails and cannot get a write profile, the storage library determines the storage nodes from a replication relationship described in the storage list.

Step 1505: The storage library selects randomly one storage node from the storage nodes found in Step 1504. By choosing a storage node randomly, on average the load will become balanced. However, there may be other ways as well, including selecting a storage node based on current load (for example, the load on each storage node).

Step 1506: The storage library reads a requested object together with its write profile from the determined storage node by using the interface specified in the storage list.

Step 1507: The storage library checks the object read succeeded.

Step 1508: If the answer to Step 1507 is NO (or the answer to Step 1511 below is NO), the storage library returns to Step 1506 to try another storage node which has a replica by calling Determine_Next_Storage_Node.

Step 1509: If the answer to Step 1507 is YES, once the object data is read, the storage library checks whether the Self CRC Check field in the write profile is YES.

Step 1510: If the answer to Step 1509 is YES, the storage library generates a CRC from the read object data.

Step 1511: The storage library checks whether the calculated CRC is the same as the value in the CRC field of the write profile (the write profile, as read in Step 1506, is needed to check the CRC).

Step 1512: If the answer to Step 1511 is YES, the storage library sends a completion message to the requester with the read object data, and the procedure ends.

Figure 16:
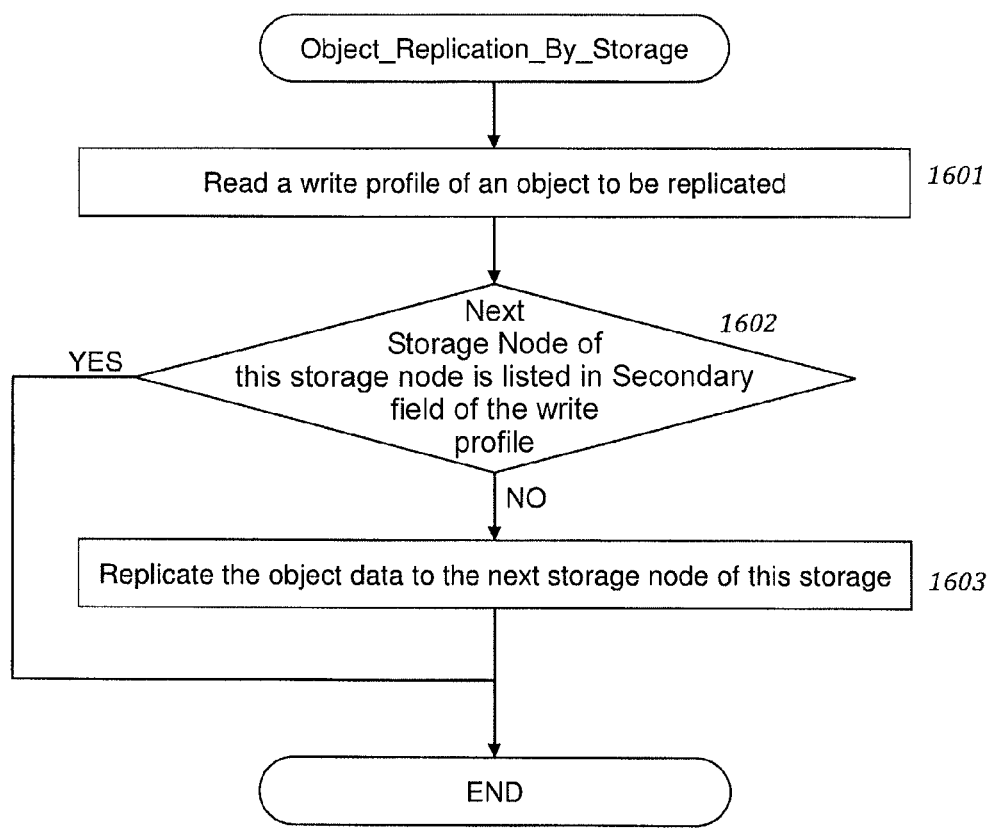
FIG. 16 shows an example of an Object_Replication_By_Storage procedure performed by a storage node.

In these embodiments, a write profile is newly introduced to manage an object. A write profile is stored together with object data in the same storage node, so it is possible to use the write profile by the storage node itself to improve its functions. FIG. 16 shows such an example.

FIG. 16 shows an object replication function of a storage system. It does not replicate an object even if the storage system is configured to replicate objects, if the object is already copied by a server.

Step 1601: The storage node reads a write profile of an object to be replicated.

Step 1602: The storage node checks whether a storage node to which this storage node makes a replica of an object is listed in the Secondary field of the write profile.

Step 1603: If listed, there is no object replication performed by the storage node, and the procedure ends.

Step 1604: If not listed, the storage node replicates the object to the next storage node, and the procedure ends.

In the embodiments described above, a write profile is stored together with its corresponding object data. However, all write profiles can be stored in a database server. By having all write profiles in the same database, it is possible to manage all objects centrally, such as where the objects are replicated.

Furthermore, in the storage type table of the embodiments described above, there is a RAID column indicating whether a storage node supports RAID data protection. This information can be used to decide the number of replications to be created for increasing the availability of objects. If the purpose of the object replication is not for load balancing, and if the storage system supports RAID, the number of replicas of an object can be increased and thereby conserve storage capacity.

Additionally, in the storage list, there is an Initial Replication column indicating whether a storage node is still in the process of initial data copy. In such a case, it is expected that even if the storage node supports object replication, more time will be required until the replication is completed. Thus, a storage library can be configured to decide to create a replication by itself instead of using the replication capability of a storage node. The storage library can write an object data to a different storage node or to the same storage node. In the case of writing to the same storage node, the storage node does not copy the same data to the next storage node by checking a write profile.

Moreover, the write profile includes Date and Server MAC information. This information can be used for detecting which replicas are newer than others, as well as inconsistency of objects.

In addition, when a new type of a storage node is added to the system, the storage node has no data at first. However, the new storage node does have its own managed hash table, and thus storage libraries start to store new objects in the new storage node, the hash values of which objects are included in the managed hash space of the new storage. Also, some objects are stored in a different storage node, whose managed hash space no longer includes the hash values of the objects. In such a case, these objects are moved to the new storage node whose managed hash space includes their hash values.

While the invention has been described in terms of its preferred embodiments, numerous modifications may be made without departing from the spirit and scope of the present invention. It is intended that all such modifications fall within the scope of the appended claims.

I claim:

1. A service system comprising:
   a processor;
   a memory operatively coupled to the processor; and
   a plurality of servers arranged for applications to run thereon;
   in each server of the plurality of servers, a storage library arranged such that the applications use the storage library to read/write data via a network to/from plural storage nodes of different types;
   wherein each server of the plurality of servers is arranged to hold a storage list of storage nodes that store objects;
   wherein the storage library in each server of the plurality of servers is arranged to manage capabilities of the storage nodes, the capabilities including object replication in response to an object replication request by an application of the applications or object integrity checking in response to an object integrity checking request by the application, in the event a storage node targeted by the request lacks a capability to perform the requested object replication or object integrity checking;
   wherein the storage library in each server of the plurality of servers is further arranged to create a write profile for each object created, the write profile including a storage node location for holding an object replica before replication of the object is performed, and information indicating whether an object replication is to be performed by the storage library or by a storage node of the storage nodes having a location for holding the object replica;
   wherein each storage node of the storage nodes is arranged to hold a write profile of an object indicating whether the object is stored in a storage node of the storage nodes holding the write profile;
   wherein in response to a request by an application for object replication, and if the write profile of the object specifies replication by the storage library, the storage library writes an object data together with its write profile to a primary storage node identified in the write profile as storing an original of the object, and writes the object data together with its write profile to all secondary storage nodes identified in its write profile as storage nodes in which replicas of the object data are stored;
   wherein the storage library determines, from an object write request received from an application, whether the storage library or the storage node as the primary storage node of the write request is to perform any replication of the object data; and
   wherein when the primary storage node is determined to perform a replication of the object data, the primary storage node reads the write profile of the object to be replicated, checks whether the next storage node as the secondary storage node is specified in the write profile, if the next storage node as the secondary storage node is specified in the write profile, the primary storage node does not perform the replication, but if the next storage node as the secondary storage node is not specified in the write profile, the primary storage node performs the replication to the next storage node.

2. The service system according to claim 1, wherein the secondary storage nodes are arranged to store object data replicas made by both the storage library and the storage node having the primary storage.

3. The service system according to claim 1, wherein the storage library in each server of the plurality of servers is arranged so that all applications requesting access to object data held in one or more of the storage nodes are able to access the object data without regard to type of storage node.

4. The service system according to claim 1, wherein the storage nodes include at least one node having no object management capability, at least one node having an object replication capability but no object integrity checking capability, and at least one node having both object replication capability and object integrity checking capability.

5. The service system according to claim 1, wherein object replication relationships among storage nodes are held in the storage list and updated by changing the storage list as storage nodes are added or removed, regardless of storage node type.

6. A method for managing capabilities of a storage library and storage nodes in a service system, comprising the steps of:
   creating a write profile of an object to be written in response to a write request;
   adding a specification to the write profile that indicates whether the object is to be replicated by the storage library or by a primary storage node identified in the write profile and to which the object is to be written in response to the write request;
   writing the object data and the write profile to the primary storage node identified in the write profile; and
   replicating the object data and write profile to a secondary storage node identified in the write profile;
   wherein the storage library is part of a service system having plural servers and plural storage nodes connected to the servers by a network, one server of the plurality of servers having the storage library; and
   wherein the step of creating a write profile includes steps of:
   setting, by the storage library, an object name of the object in the write profile;
   calculating, by the storage library, a hash value from the object name;
   determining, by the storage library, the primary storage node that manages a hash space that includes the calculated hash value;
   setting an IP address of the primary storage node in the write profile; and
   checking, by the storage library, whether a number of replicas specified in the write request to be created of the object is not zero;

if the number of replicas is not zero, checking the write profile, by the storage library, to determine whether the primary storage node is able to replicate data by itself;

if the primary storage node is able to replicate data by itself, checking the write profile, by the storage library, to determine whether a synchronous replication is required for replicating the object;

if a synchronous replication is required, determining, by the storage library, whether the primary storage node can perform a synchronous replication;

if the primary storage node can perform a synchronous replication, checking, by the storage library, whether replications by the storage node are requested from an application by judging whether the number of replicas in the write request are greater than the number of replicas of the storage node;

if replications by the storage node are requested by the application, calling, by the storage library, a procedure by which the primary storage node replicates the object;

if a synchronous replication is not required, setting in the write profile, by the storage library, the number of replicas requested in the write request to be the number of replicas to be created; and if replications by the storage node are not requested by the application, setting in the write profile, by the storage library, the number of replicas requested in the write request minus the number of replicas to be performed by a storage node; and calling, by the storage library, a procedure by which the storage library performs the replication.

7. The method according to claim 6, wherein the step of calling a procedure by which the storage library replicates the object comprises the steps of:

setting in a storage list, by the storage library, an IP address of the primary storage node specified in the write profile as a Next_Storage_Node variable indicating the next storage node which is a target of replication;

calling, by the storage library, a procedure by which the next storage node of the primary node is determined, and storing the next storage node of the primary storage node as the Next_Storage_Node variable;

checking, by the storage library, whether the next storage node is already specified in the write profile as a secondary storage node, which is a target of replication, and if the next storage node is already so specified, looking for another storage node as a next storage node;

if the next storage node is not already so specified, setting in the write profile, by the storage library, the next storage node as the secondary storage node;

checking, by the storage library, whether it has finished finding the same number of storage nodes as the number of replicas specified in the write profile, and if not, looking for another storage node;

if the storage library has finished finding the same number of storage nodes as the number of replicas specified in the write profile, specifying in the write profile, by the storage library, that replication is required to be performed by the storage library; and setting in the write profile, by the storage library, the replication type field of the write profile to the same value as the replication type field of the write request.

8. The method according to claim 7, wherein the step of calling a procedure by which the next storage node of the primary node is determined comprises the steps of:

finding, by the storage library, a storage which has a replication relationship to a secondary storage node specified as the next storage node; and if such a storage node cannot be found, determining, by the storage library, a storage node having the next hash space to that of the storage node specified as the next storage node.

9. The method according to claim 6, further comprising the step of:

determining whether a data integrity check for the object data Is required by the storage library;

wherein the determining step comprises the steps of:

checking, by the storage library, whether the write request requires a data integrity check;

if the write request requires a data integrity check, checking the write profile, by the storage library, whether the primary storage node has a data integrity check capability; and if the primary storage node does not have a data integrity check capability, performing, by the storage library, a data integrity check for the object data.

10. The method according to claim 6, wherein when a read request is received from an application, the storage library performs a method comprising the steps of:

determining whether load balancing of the storage nodes is required; and determining whether a data integrity check of the read object data is required;

wherein the step of determining whether load balancing is required comprises the steps of:

determining, by the storage library, a storage node which has an original of the read object;

checking, by the storage library, whether load balancing is requested in the read request;

if load balancing is requested in the read request, finding, by the storage library, all storage nodes which have replicas by calling a procedure by which the next storage node of the primary node is determined;

if the number of replicas was not provided from the application, reading, by the storage library, the write profile to determine how many objects are replicated, but if the number of replicas cannot be read from the write profile, the storage library determines the storage nodes that have replicas from a prestored replication relationship;

selecting, by the storage library, one of the storage nodes having replicas, whose selection improves load balancing;

reading, by the storage library, the object requested in the read request together with its write profile from the determined storage node;

checking, by the storage library, whether the object read succeeded; and if the object read did not succeed, trying, by the storage library, another storage node which has a replica by again calling the procedure by which the next storage node of the primary node is determined;

if the object read succeeded, checking the write profile, by the storage library, whether the storage node performs data integrity checking;

if the storage node does not perform data integrity checking, the storage library calculates a data integrity value of the object data, and checks whether the calculated data integrity value is equal to a data integrity value specified in the write profile; and if the calculated data integrity value is equal to the data integrity value specified in the write profile, the read object is transmitted to the requesting application.

11. A non-transitory computer-readable medium containing computer-readable information which, when executed by a computer, causes the computer to perform a method for managing capabilities of a storage library and storage nodes in a service system comprising the steps of:

creating a write profile of an object to be written in response to a write request;

adding a specification to the write profile that indicates whether the object is to be replicated by the storage library or by a primary storage node identified in the write profile and to which the object is to be written in response to the write request;

writing the object data and the write profile to the primary storage node identified in the write profile; and replicating the object data and write profile to a secondary storage node identified in the write profile;

wherein the storage library is part of a service system having plural servers and plural storage nodes connected to the servers by a network, one server of the plurality of servers having the storage library;

wherein the step of creating a write profile includes steps of:

setting, by the storage library, an object name of the object in the write profile;

calculating, by the storage library, a hash value from the object name;

determining, by the storage library, the primary storage node that manages a hash space that includes the calculated hash value; and setting an IP address of the primary storage node in the write profile; and wherein the adding step comprises the steps of:

checking, by the storage library, whether a number of replicas specified in the write request to be created of the object is not zero;

if the number of replicas is not zero, checking the write profile, by the storage library, to determine whether the primary storage node is able to replicate data by itself;

if the primary storage node is able to replicate data by itself, checking the write profile, by the storage library, to determine whether a synchronous replication is required for replicating the object;

if a synchronous replication is required, determining, by the storage library, whether the primary storage node can perform a synchronous replication;

if the primary storage node can perform a synchronous replication, checking, by the storage library, whether replications by the storage node are requested from an application by judging whether the number of replicas in the write request are greater than the number of replicas of the storage node;

if replications by the storage node are requested by the application, calling, by the storage library, a procedure by which the primary storage node replicates the object;

if a synchronous replication is not required, setting in the write profile, by the storage library, the number of replicas requested in the write request to be the number of replicas to be created;

if replications by the storage node are not requested by the application, setting in the write profile, by the storage library, the number of replicas requested in the write request minus the number of replicas to be performed by a storage node; and calling, by the storage library, a procedure by which the storage library performs the replication.

12. The non-transitory computer-readable medium according to claim 11, wherein the step of calling a procedure by which the storage library replicates the object comprises the steps of:

setting in a storage list, by the storage library, an IP address of the primary storage node specified in the write profile as a Next_Storage_Node variable indicating the next storage node which is a target of replication;

calling, by the storage library, a procedure by which the next storage node of the primary node is determined, and storing the next storage node of the primary storage node as the Next_Storage_Node variable;

checking, by the storage library, whether the next storage node is already specified in the write profile as a secondary storage node, which is a target of replication, and if the next storage node is already so specified, looking for another storage node as a next storage node;

if the next storage node is not already so specified, setting in the write profile, by the storage library, the next storage node as the secondary storage node;

checking, by the storage library, whether it has finished finding the same number of storage nodes as the number of replicas specified in the write profile, and if not, looking for another storage node;

if the storage library has finished finding the same number of storage nodes as the number of replicas specified in the write profile, specifying in the write profile, by the storage library, that replication is required to be performed by the storage library; and setting in the write profile, by the storage library, the replication type field of the write profile to the same value as the replication type field of the write request; and wherein the step of calling a procedure by which the next storage node of the primary node is determined comprises the steps of:

finding, by the storage library, a storage node which has a replication relationship to a secondary storage node specified as the next storage node; and if such a storage node cannot be found, determining, by the storage library, a storage node having the next hash space to that of the storage node specified as the next storage node.

13. The non-transitory computer-readable medium according to claim 11, further comprising the step of:

determining whether a data integrity check for the object data Is required by the storage library;

wherein the determining step comprises the steps of:

checking, by the storage library, whether the write request requires a data integrity check;

if the write request requires a data integrity check, checking the write profile, by the storage library, whether the primary storage node has a data integrity check capability; and if the primary storage node does not have a data integrity check capability, performing, by the storage library, a data integrity check for the object data.

14. The non-transitory computer-readable medium according to claim 11, wherein when a read request is received from an application, the storage library performs a method comprising the steps of:

determining whether load balancing of the storage nodes is required; and determining whether a data integrity check of the read object data is required;

wherein the step of determining whether load balancing is required comprises the steps of:

determining, by the storage library, a storage node which has an original of the read object;

checking, by the storage library, whether load balancing is requested in the read request;

if load balancing is requested in the read request, finding, by the storage library, all storage nodes which have replicas by calling a procedure by which the next storage node of the primary node is determined;

if the number of replicas was not provided from the application, reading, by the storage library, the write profile to determine how many objects are replicated, but if the number of replicas cannot be read from the write profile, the storage library determines the storage nodes that have replicas from a prestored replication relationship;

selecting, by the storage library, one of the storage nodes having replicas, whose selection improves load balancing;

reading, by the storage library, the object requested in the read request together with its write profile from the determined storage node;

checking, by the storage library, whether the object read succeeded;

if the object read did not succeed, trying, by the storage library, another storage node which has a replica by again calling the procedure by which the next storage node of the primary node is determined;

if the object read succeeded, checking the write profile, by the storage library, whether the storage node performs data integrity checking;

if the storage node does not perform data integrity checking, the storage library calculates a data integrity value of the object data, and checks whether the calculated data integrity value is equal to a data integrity value specified in the write profile; and if the calculated data integrity value is equal to the data integrity value specified in the write profile, the read object is transmitted to the requesting application.

* * * * *